Nov. 15, 1960 J. M. DODWELL 2,960,258
APPARATUS FOR SEED PLANTING
Filed Oct. 12, 1953 6 Sheets-Sheet 1

INVENTOR.
John M. Dodwell
BY
Hill, Sherman, Meroni, Gross & Simpson
ATTORNEYS

Nov. 15, 1960   J. M. DODWELL   2,960,258
APPARATUS FOR SEED PLANTING
Filed Oct. 12, 1953   6 Sheets-Sheet 2
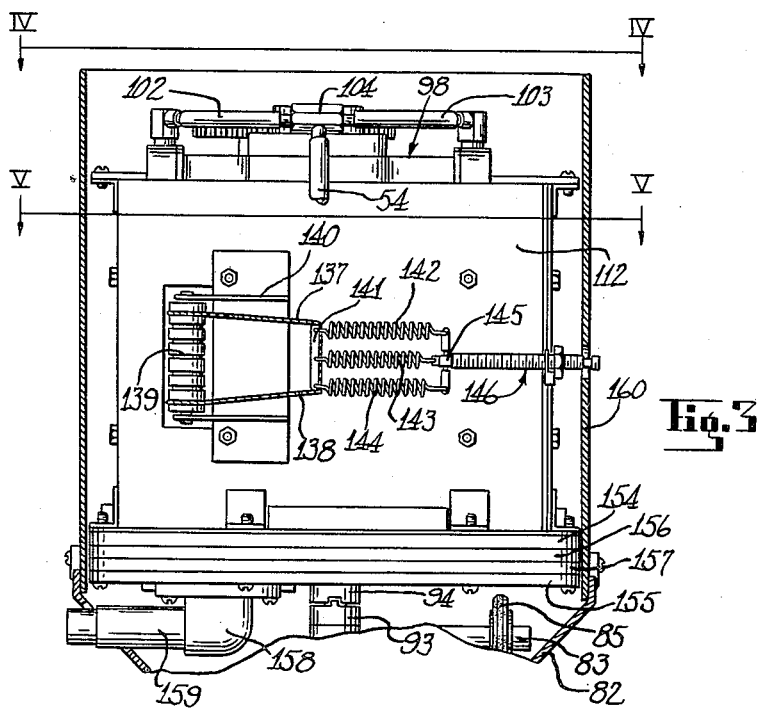
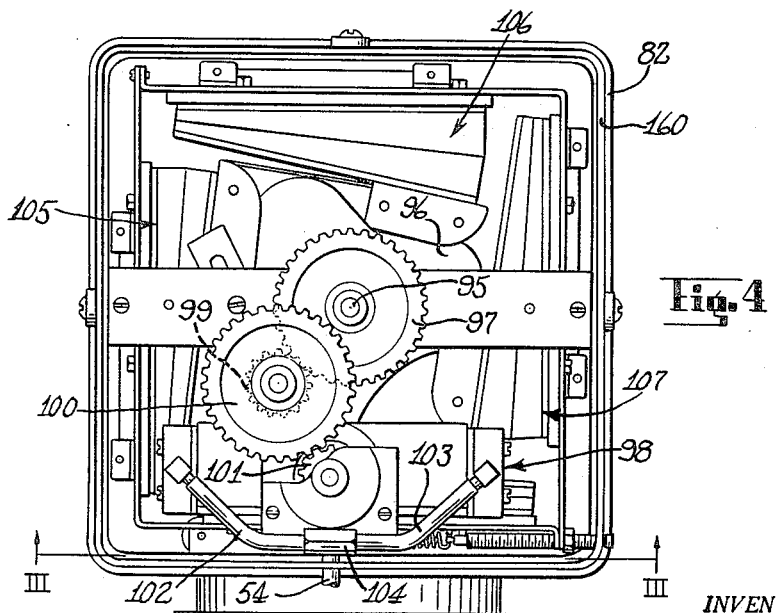
INVENTOR.
John M. Dodwell
BY
ATTORNEYS Nov. 15, 1960 — J. M. DODWELL — 2,960,258
APPARATUS FOR SEED PLANTING
Filed Oct. 12, 1953 — 6 Sheets-Sheet 3

INVENTOR.
John M. Dodwell
BY Hill, Sherman, Meroni, Gross & Simpson
ATTORNEYS

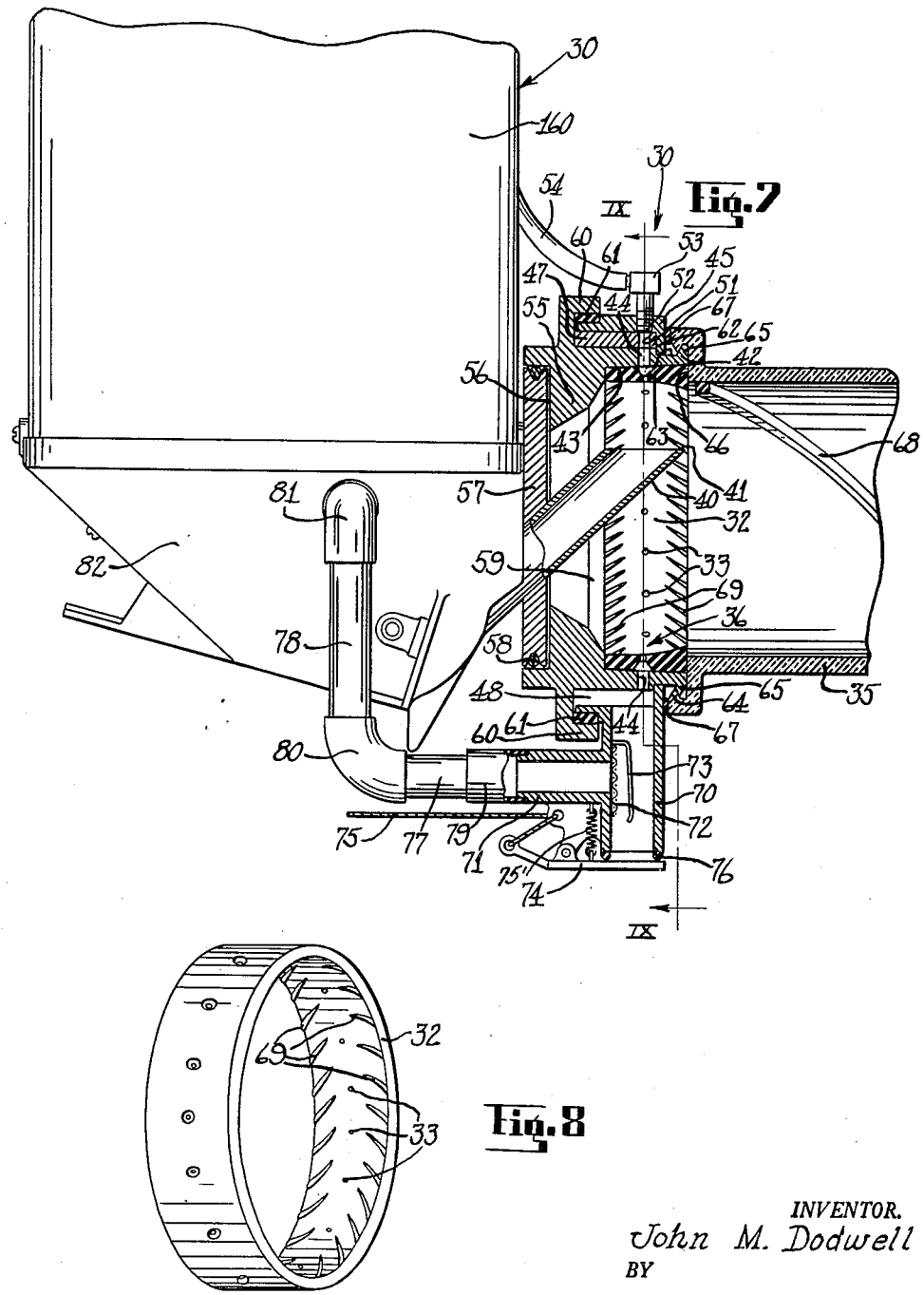

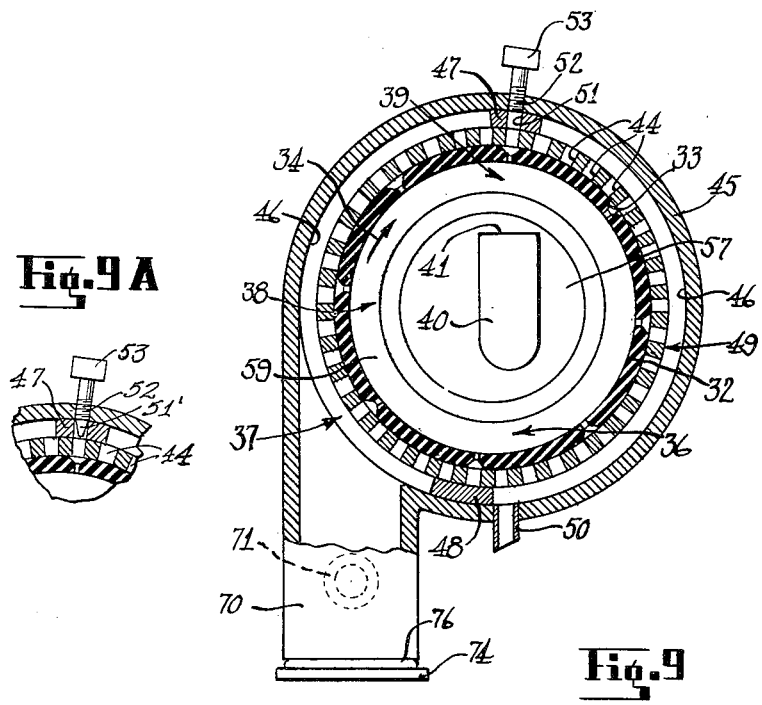
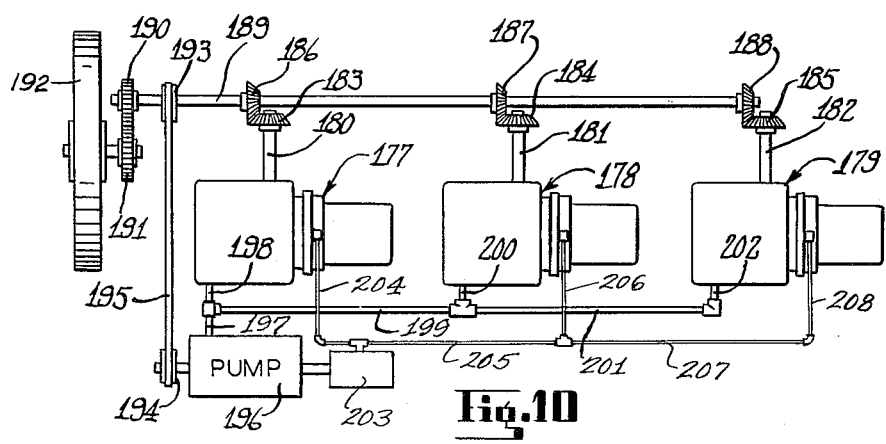

Nov. 15, 1960      J. M. DODWELL      2,960,258
APPARATUS FOR SEED PLANTING

Filed Oct. 12, 1953      6 Sheets-Sheet 6

INVENTOR.
John M. Dodwell
BY
Hill, Sherman, Meroni, Gross & Simpson
ATTORNEYS

United States Patent Office 2,960,258
Patented Nov. 15, 1960

2,960,258
APPARATUS FOR SEED PLANTING

John M. Dodwell, 402½ Rynearson St., Buchanan, Mich.

Filed Oct. 12, 1953, Ser. No. 385,643

14 Claims. (Cl. 221—93)

This invention relates to a method and apparatus for seed planting and more particularly to a method and apparatus for seed planting in which an extremely accurate and uniform planting of seeds of all sizes is achieved.

In the past, extreme difficulties have been encountered in attempting to achieve uniform planting of seeds, particularly seeds of smaller sizes. For this reason, it has been the practice to plant many times the number of seeds actually required and later perform extensive thinning out operations to limit the plants to the desired number and areas. Such thinning out operations must be performed by manual labor and are very time-consuming and expensive.

It is a general object of this invention to achieve a very uniform and accurate planting of seeds of all sizes.

This invention relates particularly to a seed planter and method of seed planting of the same general nature as disclosed in my prior Patent No. 2,384,820, issued September 18, 1945.

In this type of planter, belt-like member has a plurality of spaced openings or ports smaller than the seeds to be planted. This member is so driven that each port passes sequentially through a pick-up zone, a seed separating zone and a discharge zone. In the pick-up zone, a mass of seeds is disposed adjacent one side of the member and in this zone, as well as in the separating zone, this one side is at a positive pressure differential relative to the other. In the pick-up zone, an individual seed is forced into generally sealing engagement against each port by this pressure differential and as each port passes through the separating zone, only the one individual seed remains held against each port against the one side of the member with any excess seeds dropping off.

At the discharge zone, the seed is released from engagement on the port and is conveyed therefrom to a point to be planted.

The size of the ports may be varied in accordance with the size of the seeds to be planted and the system has been utilized in the accurate and uniform planting of seeds of all sizes, ranging from tobacco seed to lima beans.

The belt member is preferably endless so that it may be continuously driven and most preferably it is in the form of a ring or annulus rotated about its axis, which is preferably horizontal, or inclined at an angle substantially less than 90° to the horizontal.

With this arrangement, a mass of seeds is disposed at a pick-up zone in the lower inner portion of the member with a separating zone at the upwardly traveling portion of the member and with a discharge zone at the upper inside portion of the member.

To deliver the seeds to a position to be planted, a discharge tube may be disposed with its upper end below the upper inner portion of the member.

According to a specific feature of the invention, the upper end of the discharge tube may be displaced from a location aligned with the axis of the annular belt member toward the downwardly traveling portion of the belt member so that a greater clearance is achieved in the separating zone without increasing the size of the belt member. This is particularly advantageous with respect to the larger seeds.

The belt member, particularly in its preferred annular form, may be of a relatively rigid form-sustaining material such as metal. Preferably, however, the belt member is of a flexible elastomeric material such as rubber and is supported within a support ring having an inner diameter slightly less than the outer diameter of the belt member in its unflexed condition so that the member is releasably held within the ring by its own resilience. Most preferably, the outer surface of the belt member and the inner surface of the ring are slightly conical to facilitate insertion of the belt member in the ring.

This arrangement is particularly advantageous in that the belt member may be readily removed and replaced by a similar member having ports spaced and dimensioned for a different type of seed.

The differential in pressure between the opposite sides of the belt member may be achieved by means of a suction pump or vacuum supply arrangement mounted for rotation with the belt member as is the case in the machine disclosed in my aforesaid patent. In that case, the suction is applied all the way around the outer periphery of the ring and to prevent the suction from acting on the downwardly traveling portion of the ring, an arcuate shoe is provided in engagement with an inner surface portion of the ring.

According to this invention, the vacuum supply is fixed and communicates with only a limited portion of the outside surface of the belt member in the pick-up and separating zones.

This may be achieved by means of a fixed hollow member disposed in spaced relation outside of the belt member with means projecting inwardly from the internal surface of the hollow member into sealing relation to the outer surface of the belt member to provide a vacuum chamber between only a limited portion of the outer surface of the belt member and the facing internal surface portion of the holow member.

By this feature, the mounting and drive is greatly simplified and a much more compact arrangement is possible. Also, it is much easier and simpler to attain communication between the pump and the proper portion of the outside of the belt member.

According to a more specific feature of the invention, communication between the ports and the vacuum supply in the seed discharge position is cut off from the outside of the belt member so that the seed drops by its own weight and it is not necessary to provide knock-off means inside the belt member nor is it necessary that the release means act against the force of the vacuum.

This feature may preferably be achieved through the means above described between the internal surface of the hollow member and the outer surface of the belt member. In this connection, it may be noted that attainment of this specific feature is greatly simplified by the fact that the vacuum supply is fixed and in communication with only a limited portion of the outside of the belt member.

According to a still further specific feature of the invention, means are provided for directing pressurized air through each port as it passes the discharge zone to insure that the seed will drop from the port into the end of the discharge tube and to clear the port of any chaff, moisture or other extraneous matter.

Still another specific feature of the invention is in the provision of a chamber around the dead side portion of the belt member, that is, the downwardly traveling portion not subjected to a pressure differential. If any chaff or other extraneous matter should drop through the ports into this chamber it will drop through an opening at its lower end thereof to fall to the ground.

This chamber and the vacuum chamber may preferably be defined by a pair of partitions extending inwardly from spaced internal surface portions of the hollow member into sealing relationship with the outer surface of the belt member to thereby separate the space between the internal surface of the hollow member and the outer surface of the belt member into two separate chambers.

Yet another feature of the invention is in the construction of the support ring for the belt member to obtain communication between the ports and the vacuum supply, the pressurized air supply and the dead chamber and to a design of the ports for cooperation therewith.

According to this feature, the support ring is provided with a plurality of circumferentially spaced openings in a plane transverse to the axis thereof and through the ports.

The openings are spaced apart a distance less than the peripheral extent of the ports on the outer surface of the belt member so that regardless of what position the belt member is in relative to the support ring, there will be communication through the ports and the openings. At the same time, the spacing should be as large as possible to achieve maximum support between the portions of the ring on opposite sides of the above-mentioned plane.

Preferably, the ports are enlarged at the outer surface of the belt member as by being beveled or conical in form so that their peripheral extent on the outer surface of the belt member is as great as possible with the spacing between the openings in the ring member at a maximum even with the size of the ports at the inner surface of the belt member being very small.

A still further specific feature of the invention is in the provision of a plurality of peripherally spaced ribs on the opposite sides of the ports on the inner surface of the belt member which ribs are slanted to project the seeds axially toward the ports as the belt member is driven.

Yet another feature is in the support of a seed supply container on the support ring for the belt member. According to this feature, the container, which is cylindrical and may preferably be composed of a transparent material such as glass or a suitable plastic, is internally threaded adjacent its open end and is arranged to be threaded onto the outside of the support ring.

Preferably, the belt member may project slightly beyond the end of the support ring and be arranged to make sealing contact with an inner annular shoulder portion of the container when the container is threaded on the support ring.

A still further feature is in the attainment of a sealing engagement between the end of the seed container and the hollow member disposed in spaced relation around the belt member, which may be achieved by a suitable gasket therebetween.

According to still another feature of the invention, the vacuum chamber about the pick-up and separating zones may be arranged for connection to a vacuum supply through a conduit communicating with the chamber at a point spaced above the lowest point therein to thereby minimize the possibility of chaff or the like being transmitted to the vacuum supply. Preferably, a suitable baffle and filter arrangement may be provided to augment this feature and prevent extraneous matter from reaching the vacuum source.

According to a specific feature, a door is provided at the aforesaid lowest point in the vacuum chamber. When the operator of the planter comes to the end of a row and wants to stop seeding while turning around, he simply opens this door which breaks the vacuum from the vacuum source and thereby prevents operation of the planter. At the same time, the accumulated chaff drops out to the ground.

Any form of vacuum pump might be utilized as a vacuum source. However, it is highly desirable that the pump should be driven from a wheel of the planter and since the planter may travel at relatively low speeds, a bellows pump has been found to be particularly effective.

The pump may preferably comprise four bellows sections arranged around the inside of four sides of a generally square housing with a cam rotatably supported within the housing and arranged to actuate the bellows. According to a specific feature of the invention, the cam has three lobes, one less than the number of bellows, so that at least one bellows will always be acting in a direction to pull a vacuum. The amount of vacuum is not critical but it is essential to the optimum operation of the planter that there always be a vacuum present.

Another important feature of the invention is in the provision of a multi-row seed planter comprising a plurality of spaced single row planters of the type described above. By this feature, a drive means is connected to all of the belt members to simultaneously drive the same with a vacuum pump and a pressure pump driven by the drive means and with means connecting the vacuum pump and the pressure pump to all of the vacuum chambers of the single row planters.

By this feature, only a single drive means and a single pair of pumps are necessary. In addition, the drive of the belt members is synchronized so that if desired the seeds planted may be aligned in rows transverse to the direction of travel of the planter.

An object of this invention, accordingly, is to provide an improved method of planting seeds in which seeds are attracted to and held against ports in a belt member under the influence of a negative pressure with the ports thereafter moved seriatim to a discharge zone separated from the negative pressure to allow the seeds to drop by gravity.

Another object of this invention is to provide an improved seed planter including a belt member having a plurality of spaced seed pick-up ports arranged to pass sequentially through a pick-up zone, a separating zone and a discharge zone with a fixed vacuum supply communicating with only a limited portion of a surface of the belt member in the pick-up and separating zones.

A further object of this invention is to provide an improved seed planter including an endless belt member having a plurality of peripherally spaced ports and to an improved support ring therefor.

Still another object of this invention is to provide an improved method of seed planting in which ports in a belt member are passed seriatim from a pick-up zone to a discharge zone with one side of the belt member subjected to a positive pressure at the discharge zone to insure release of seeds from the ports.

A still further object of this invention is to provide a seed planter including a belt member having a plurality of spaced ports therein with improved structure providing chambers for cooperation with the belt member in picking up, separating and discharging seeds.

A still further specific object of the invention is to provide a seed planter including an improved endless belt member having a plurality of peripherally spaced ports thereon with a plurality of ribs on one surface of the belt member slanted to project seeds toward the ports.

Still another specific object of the invention is to provide a seed planter having vacuum-utilizing mechanism for picking-up, separating and discharging seeds with means connecting the mechanism to a source of vacuum and arranged to prevent chaff, and other extransous matter, from reaching the vacuum source.

Yet another object of this invention is to provide an improved seed supply structure for a seed pick-up, separating and discharge mechanism.

Still another object of this invention is to provide an improved vacuum pump for the seed planter of this invention.

A still further object of this invention is to provide an improved multi-row seed planter.

Another specific object of this invention is to provide an improved method and means for temporarily stopping the seeding operation and simultaneously releasing accumulated chaff.

A still further object of this invention is to provide an improved seed planter which is highly efficient, reliable and durable and yet is compact, simple in design and readily and economically manufacturable.

A further object of this invention is to provide a belt member having an outer conical or tapered surface to facilitate insertion thereof within a support ring having a complementary inner surface.

This invention contemplates other objects, features and advantages which will become more fully apparent from the following detailed description taken in conjunction with the accompanying drawings which illustrate preferred embodiments and in which:

Figure 3 is a sectional view of a pump assembly of the seed planter taken substantially along lines III—III of Figure 2;

Figure 4 is a top plan view of the pump assembly with the cover removed, taken substantially along lines IV—IV of Figure 3;

Figure 7 is an end elevational view of the planter with a portion of the mechanism in section to illustrate the internal construction;

Figure 8 is a detail view of a preferred form of belt member used in the planter;

Figure 9 is a sectional view taken substantially along lines IX—IX of Figure 7;

Figure 9a is a view illustrating a modified chaff discharge utilizing a pressurized air jet;

Figure 10 is a top plan view illustrating schematically a multi-row planter constructed according to the principles of this invention.

Figure 1:
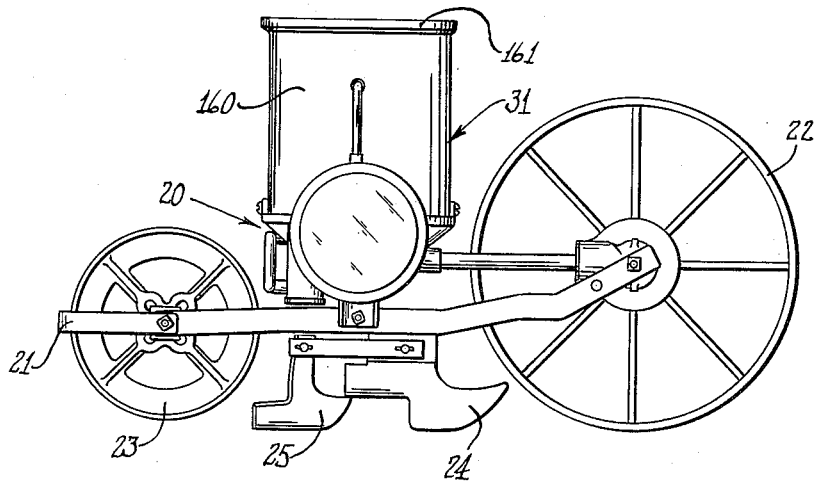
Figure 1 is a side elevational view of a seed planter constructed according to the principles of this invention and mounted on a wheeled carrier having a suitable opening plow and closing hoes.
Figure 2:
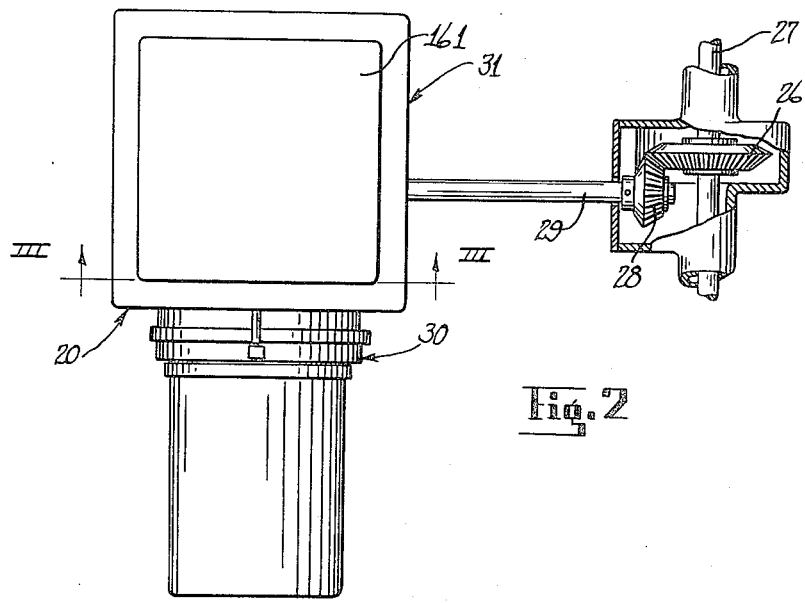
Figure 2 is a top plan view of the seed planter of Figure 1 with a portion of the drive means therefor illustrated in detail.

In the drawings, reference numeral 20 generally designates a seed planter constructed according to the principles of this invention which may be mounted on a frame 21 supported by a front wheel 22 and a rear wheel 23. Also carried by the frame 21 is a furrow-opening plow 24, and a furrow-closing hoe 25, the planter 20 being arranged to drop seeds intermediate the plow 24 and hoe 25.

The planter 20 includes mechanism which must be driven and for this purpose, a bevel gear 26 is secured to a shaft 27 which is secured to and supports the front wheel 22, a second bevel gear 28 being meshed with the gear 26 and being secured to the forward end of a shaft 29, the rearward end of which extends into the planter 20 to drive the mechanism thereof, as will be described in detail hereinafter.

The planter 20 comprises a seed pick-up, separating and discharge mechanism generally designated by reference numeral 30 and a pump assembly generally designated by reference numeral 31 for supplying a vacuum and pressurized air for proper operation of the mechanism 30.

Important features of the present invention reside both in the pump assembly 31 and in the seed pick-up, separating and discharge mechanism 30, and in the combination of the two. It is believed, however, that the general nature of the invention will be best understood by first describing the seed pick-up, separating and discharge mechanism 30.

The seed pick-up, separating and discharge mechanism 30 comprises a belt member 32 which has a plurality of spaced ports 33 therein (Figs. 7, 8 and 9). This belt member 32 is preferably endless so that it may be continuously driven and most preferably it is in the form of a ring or annulus having a generally horizontal axis, as illustrated. Suitable means are provided for rotating the annular belt member 32 about its horizontal axis as will be described in detail hereinafter. The direction of rotation may be clockwise as designated by the arrow 34 in Figure 9.

Seeds of a size larger than the ports 33 are supplied into the lower inner portion of the annular belt member 32 from a seed supply container 35, this lower inner portion of the annular ring 32 forming a seed pick-up zone as generally designated by reference numeral 36.

As the annular belt member 32 is rotated, and as each port passes through the pick-up zone 36, an individual seed is attracted to and held against the port by means of a differential in pressure between the inside and the outside of the belt member 32. This differential in pressure may preferably be achieved by means of a vacuum chamber generally designated by reference numeral 37.

As the belt member 32 is rotated, each of the ports 33 passes sequentially from the seed pick-up zone 36 through a seed separating zone 38. In the separating zone 38, the belt member is subjected to the same differential in pressure as in the pick-up zone 36 so that an individual seed attracted to a port in the pick-up zone 36 will be retained against that port as it passes through the separating zone 38. In the separating zone 38, however, the travel of the ports 33 is upward and seeds not retained by a port will fall by gravity back toward the pick-up zone 36.

After each port 33 passes through the separating zone 38, it arrives at a seed discharge zone generally designated by reference numeral 39. In this zone, each port 33 is separated from the vacuum chamber 37 so that the seed may drop by gravity.

A discharge tube 40 has its upper end 41 positioned to receive the seeds as they drop from the discharge zone 39, and the tube 40 is arranged to convey the discharged seeds to a position in which they are dropped into the furrow made by the opening plow member 24.

According to a specific feature of the invention, the upper end 41 of the discharge tube 40 may be offset away from the separating zone 38 from a position aligned with the axis of the annular belt member 32 so that greater clearance is achieved in the separating zone 38 without necessitating the use of a larger belt member. This is particularly advantageous when the planter is used with the larger seeds.

The belt member 32 may be of a relatively rigid form-sustaining material such as metal. Preferably, however, the belt member 32 is of a flexible elastomeric material such as rubber and is supported within a support ring 42 which has a generally cylindrical inner surface 43 of a diameter slightly less than the diameter of the belt member 32 in its unflexed condition so that the belt member 32 is held in position by its own inherent resilience.

Preferably, the belt member 32 has a conical outer surface and the ring 42 has a complementary conical inner surface as illustrated so that the belt member 32 may be readily removed and replaced by a similar member having ports spaced and dimensioned for a different type of seed.

According to a further feature of the invention, communication with the ports 33 at the outside surface of the belt member 32 is provided by means of a plurality of circumferentially spaced openings 44 in the support ring 42, the openings 44 being in a plane transverse to the axis of rotation of the support ring 42 and intersecting the ports 33.

The openings 44 are spaced apart a distance less than the peripheral extent of the ports 33 at the outer surface of the belt member 32 so that regardless of what position the belt member 32 is in relative to the support ring 42, there will be communication with the ports from the outside of the belt member.

At the same time, the spacing between the openings 44 should be as large as possible to achieve maximum support between the portions of the ring 42 on opposite sides of the aforementioned plane.

Preferably, the ports 33 are enlarged at the outer surface of the belt member 32, as by being beveled or conical in the manner as illustrated, so that their peripheral extent on the outside surface of the belt member is as great as possible thus allowing a maximum spacing between the openings 44 in the support ring 42 even with the size of the ports 33 at the inner surface of the belt member being very small.

According to an important feature of this invention, the vacuum chamber 37 communicates with only a limited portion of the outside surface of the belt member opposite the pick-up and separating zones 36 and 38. By this feature, the vacuum supply means may be mounted separate from the belt member 32 and establishing communication between the vacuum supply means and the proper portion of the belt member is greatly simplified.

Further, communication between each port and the vacuum supply may be cut off from the outside of the belt member in the discharge position of the ports so that the seeds will drop off by their own weight and it is not necessary to provide knock-off means inside the belt member nor is it necessary that the seed release means act against the force of the vacuum.

The vacuum chamber 37 is preferably defined by a fixed hollow member 45 having an inner surface 46 outside the belt member 32 in spaced facing relation to the outer surface thereof, with means projecting inwardly from the inner surface 46 into sealing relation to the outer surface of the belt member 32 to limit the effect of the vacuum in chamber 37 to only a limited portion of the belt member opposite the pick-up zone 36 and separating zone 38.

Such means may preferably comprise a pair of partition members 47 and 48 extending inwardly from the inner surface 46 of the hollow member 45 into sealing relation to the outer surface of the belt member 32. This sealing relation is achieved by making the members 47 and 48 of a width greater than the openings 44 in the support ring 42.

The partition member 47 is located adjacent the upper end of the belt member 32 and thus provides a means separating the ports from the vacuum chamber 37 in the discharge zone 39 to allow the seeds to drop by their own weight into the discharge tube 40.

The partition member 48 is located below the bottom of the belt member 32 in a position almost diametrically opposite the partition member 47 so that the entire space between the inner surface 46 of the hollow member 45 and the outer surface of the belt member 32 is divided into the vacuum chamber 37 and a second chamber 49 which may be called a dead chamber.

Provision of the dead chamber 49 constitutes a space into which any remaining chaff and other extraneous matter may drop. Accordingly, a tube 50 is provided in communication with the extreme lower end of the chamber 49 so that such matter may drop there-through to fall to the ground.

According to still another feature of the invention, a stream of pressurized air is forced through each port 33 as it passes the discharge zone 39 to insure that the seed will drop from the port into the end of the discharge tube 40 and to clear the port of any chaff, moisture or other extraneous matter.

In accordance with this feature, a passage 51 may be provided in the partition member 47 with an opening 52 in the wall of the hollow member 45 into which a fitting 53 is threaded. The fitting 53 may be connected through a tube 54 to a source of pressurized air as will be described in detail hereinafter.

As shown in Figure 9a, a jet nozzle 51' may be disposed within the passage 51 to increase air velocity.

The support ring 42 may be journaled for rotation in any desired manner. Preferably, however, it has an integral portion 55 projecting radially inwardly to define an annular recess 56 complementary to a fixed circular plate member 57 which may be grooved around its outer periphery to receive an O-ring gasket 58 for providing a sealing engagement with the support ring 42. The integral inwardly projecting portion 55 of the ring 42 preferably has a generally tapered surface 59 as illustrated to direct seeds toward the belt member 32.

For further support of the support ring 42, it has an integral radially outwardly projecting portion 60 having a generally L-shaped cross-section to receive a portion of the hollow member 45, a gasket 61 being provided between the outer surface of the member 45 and the inwardly facing surface of the L-shaped projection 60.

For still further support of the support ring 42, the member 45 may have a radially inwardly projecting annular flange 62 which may engage in a groove 63 in the outer surface of the support ring 42.

It might here be noted that the partition members 47 and 48, in addition to serving their functions as outlined above, also provide additional support for the support ring 42.

Another specific feature of the invention is in the support of the seed supply container 35 on uthe support ring 42. According to this feature, the container 35, which is cylindrical and may preferably be composed of a transparent material such as glass or a suitable plastic, is internally threaded adjacent its open end as indicated by reference numeral 64 and is arranged to be threaded onto the outside of the ring 42, the ring 42 having outwardly projecting ridges 56 for this purpose.

The belt member may preferably project slightly beyond the end of the support ring 42 so as to make sealing contact with an annular shoulder portion 66 of the container 35 when the container is threaded onto the support ring 42.

According to a further specific feature of the invention, a sealing engagement is provided between the end of the container 35 of the member 45 by a gasket 67 therebetween.

The container 35, of course, rotates with the support ring 42 and the belt member 32. To achieve flow of the seeds toward the belt member 32 as the container 35 is thus rotated, a rib-defining member 68 may be secured in spiral form to the inside surface of the container 35.

Still another specific feature of the invention is in the provision of a plurality of peripherally spaced ribs 69 on opposite sides of the ports 33 on the inner surface of the belt member 32 which ribs are slanted to project the seeds axially toward the ports 33 as the belt member 32 is rotated. Also, if desired, the inner surface of the belt member 32 may be slightly concave.

According to another feature of the invention, the member 45 has an integral generally tubular portion 70 projecting downwardly from the vacuum chamber 37 to provide a space which may be considered a portion of the vacuum chamber 37. Spaced above the lower end of the portion 70 is a laterally projecting integral sleeve portion 71 defining a conduit for connection to the source of vacuum. This spacing is highly desirable since chaff and other extraneous matter may drop to the lower end of the portion 70 so as not to be conveyed to the vacuum source. In addition, a filter screen 72 is preferably placed over the inner end of the sleeve 71 and a baffle 73 is spaced from the filter 72 so that air passing from the chamber 37 to the sleeve 71 must go through a circuitous path.

The lower end of the portion 70 may be permanently closed but preferably a hinged door 74 is provided for closing off the lower end of the portion 70, the door 74 being actuatable by means of a cord 75. This structure is highly advantageous in that when the operator comes to the end of a row and want to stop seeding while turning around, he may simply pull the cord 75 to open the door 74 and vent the chamber 37 to atmospheric pressure and thus prevent seeding, while at the same time, accumulate chaff drops out to the ground.

The door 74 is urged toward closed position by any desired means such as a spring 75' and preferably a sealing gasket 76 is provided between the door and the lower end of the portion 70.

The outer end of the sleeve 71 is connected to the pump assembly 31 through conduit sections 77 and 78, a sleeve connector 79 and elbow fittings 80 and 81.

Figure 6:
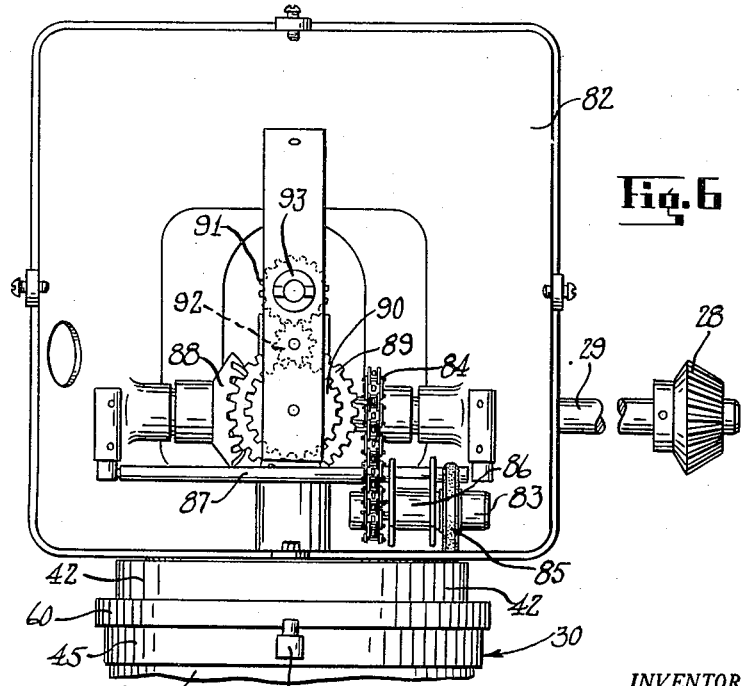
Figure 6 is a top plan view of a portion of the planter with the pump assembly removed therefrom to illustrate a portion of the drive mechanism of the planter.

The drive for the support ring 42 is best illustrated in Figure 6 which is a top plan view of the planter with the pump assembly 31 removed therefrom. As shown in this figure, the shaft 29 projects into and is journaled in a generally cup-shaped base portion 82 of the planter. A second shaft 83 parallel to the shaft 29 is journaled within the hollow base member 82 and is driven from the shaft 29 through a chain 84. This shaft 83 carries a friction wheel 85 which engages the ring 42 through a slot in the base member 82 so that as the shaft 29 is rotated from the front wheel 22 of the planter support, the ring 42 together with the belt member 32 is driven therefrom.

Preferably, the shaft 83 is carried by a bracket 86 pivoted on a parallel support shaft 87 with the bracket 86 preferably spring-urged to urge the friction wheel 85 into light frictional engagement with the ring 42.

As also shown in Figure 6, the driven shaft 29 carries a bevel gear 88 meshed with a bevel gear 89 which carries a gear 90 meshed with a gear 91 through an intermediate gear 92. The gear 91 is arranged to drive the pump assembly through a coupling element 93.

Figure 5:
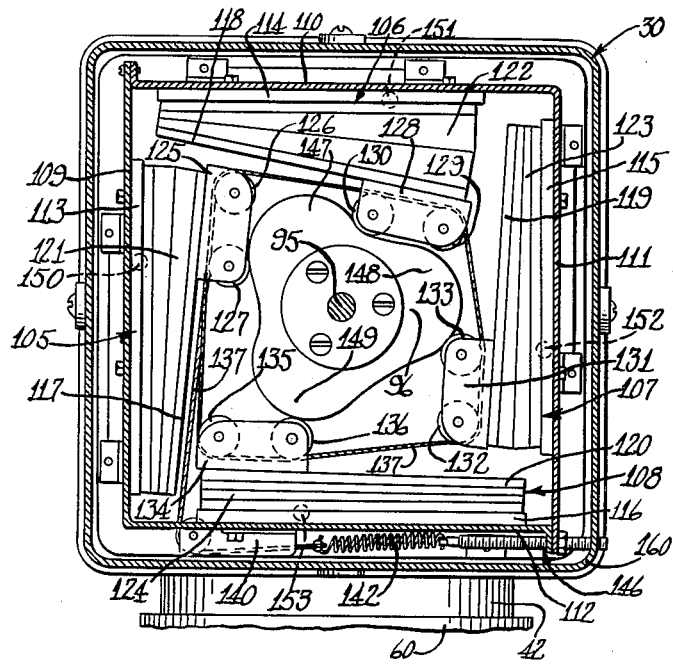
Figure 5 is a sectional view through the pump assembly taken substantially along lines V—V of Figure 3.

As shown in Figure 3, this coupling element 93 engages a second coupling element 94 projecting from the lower end of the pump assembly 31, the two elements being automatically engaged when the assembly 31 is mounted on the base member 82. Element 94 is secured to a shaft 95 extending vertically through the pump assembly 31 (Figures 4 and 5) and carrying a cam 96 for actuating a bellows-type vacuum pump (to be described in detail hereinafter) and a gear 97 which drives an air pump generally designated by reference numeral 98, the gear 97 being in mesh with a gear 99 which carries a gear 100 in mesh with a gear 101 on the drive shaft of the air pump 98.

The air pump 98 has two outlets at opposite ends thereof coupled through lines 102 and 103 to a T fitting 104 from which the line 54 extends to supply pressurized air to the mechanism 30 for the purposes as described above in detail.

The vacuum pump comprises four bellows sections 105, 106, 107 and 108 mounted respectively on inside surfaces of four walls 109, 110, 111, and 112 forming a generally square box-like structure. The bellows sections 105, 106, 107, and 108 comprise, respectively, base plates 113, 114, 115 and 116, pivoted plates 117, 118, 119, 120 and flexible side walls 121, 122, 123 and 124.

A bracket 125 is secured to the pivoted plate 117 and carries a pair of rollers 126 and 127; a bracket 128 is secured to the plate 118 and carries a pair of rollers 129 and 130; a bracket 131 is secured to the plate 119 and carries a pair of rollers 132 and 133; and a bracket 134 is secured to the plate 120 and carries a pair of rollers 135 and 136.

To urge the plates 117, 118, 119 and 120 of the bellows sections toward the cam 96, a pair of cords 137 and 138 are tied to the bracket 125 and extend therefrom progressively around the rollers 135, 136, 132, 133, 129, 130, 126, 127, and thence around a grooved pulley 139 carried on the outside of the wall 112 by a bracket 140.

The ends of the cords 137 and 138 are integrally joined to form a loop which receives a member 141 which is connected through tension springs 142, 143 and 144 to a carrier element 145 secured to the outside of the wall 112 through an adjustable screw arrangement generally designated by reference numeral 146.

The springs 142, 143 and 144 thus serve to pull the pivotal plates 117, 118, 119 and 120 of the bellows sections toward the cam member 96 to engage the rollers 127, 130, 133 and 136 with the peripheral surface of the cam member 96. The tension of the springs 142, 143 and 144 may, of course, be adjusted by adjusting the adjustable screw arrangement 146.

According to an important feature of the invention, the cam 96 is provided with three lobes 147, 148, and 149. By using a cam member with three lobes in conjunction with the four bellows sections, at least one of the plates 117, 118, 119 and 120 must be moving in a direction away from the fixed base plates 113, 114, 115, or 116 so as to always be pulling a vacuum.

The bellows sections 105, 106, 107 and 108, are, of course, provided with air discharge outlets and suitable valve structures. The inlets of the bellows sections communicate through openings 150, 151, 152 and 153, illustrated in dotted lines in Figure 5, with a chamber which is not illustrated in detail but which is between plates 154 and 155 at the bottom side of the pump assembly, plates 156 and 157 disposed between the plates 154 and 155 having suitable cut-out portions to provide such a chamber. This chamber is connected through a conduit fitting 158 and a conduit section 159 to the elbow fitting 81 which is coupled to the vacuum chamber 37 of the mechanism 30 in a manner as described in detail above.

The pump assembly 31 may be confined within a suitable housing member 160 mounted on the base member 82 and having a cover 161.

Figure 11:
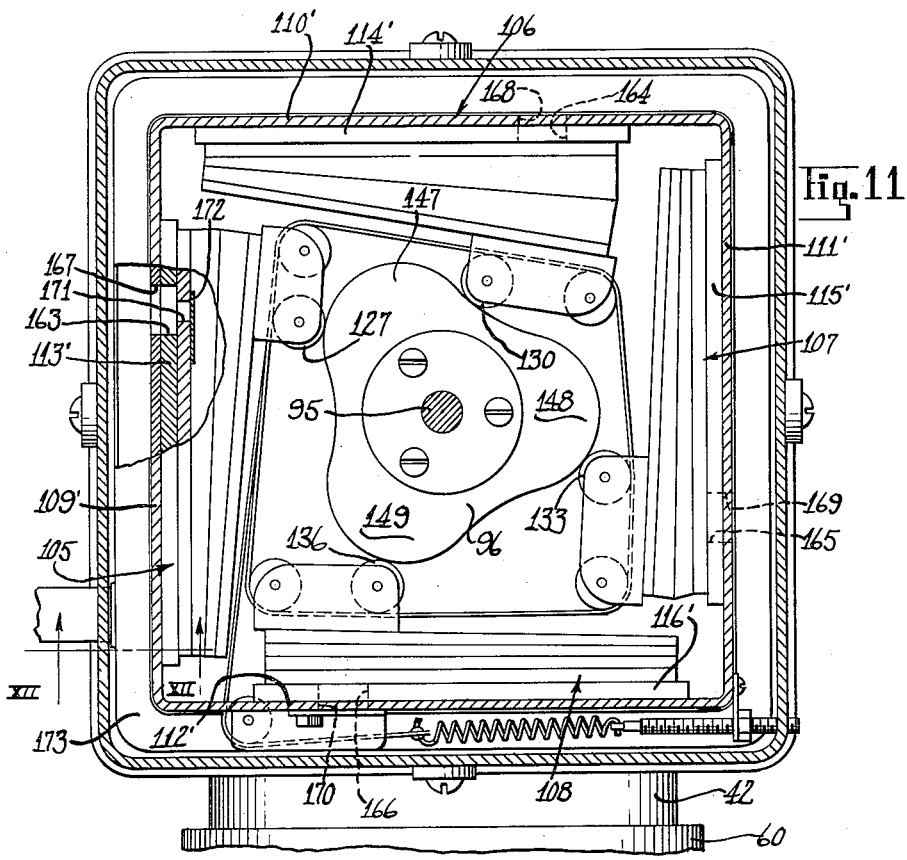
Figure 11 is a sectional view similar to Figure 5 but illustrating a modified manner of constructing the pump assembly.
Figure 12:
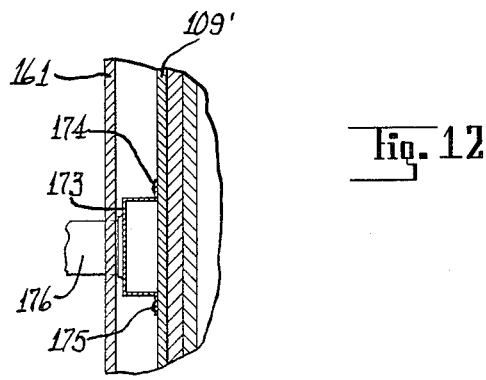
Figure 12 is a sectional view taken substantially along lines XII—XII of Figure 11.

A modified arrangement for obtaining communication between the bellows sections 105, 106, 107 and 108 and the mechanism 30 is illustrated in Figures 11 and 12. Referring thereto, the bellows sections 105, 106, 107 and 108 may include modified base plates 113', 114', 115' and 116' which have openings 163, 164, 165 and 166, respectively, therein which openings respectively register with openings 167, 168, 169 and 170 in modified wall members 109', 110', 111' and 112'. These openings register with intake ports of the bellows sections, one port 171 of the bellows section 105 being illustrated in Figure 11, this port being arranged to be closed by a flexible valve element 172.

Disposed all the way around the modified walls 109', 110', 111' and 112' is a generally channel-shaped duct 173 having out-turned flanges 174 and 175 secured in sealing relation against the outer surfaces of the wall members 109', 110', 111' and 112'. This duct, of course, provides communication between the inlet ports of all of the bellows sections.

A connector sleeve 176 is secured to one portion of the outer surface of the duct 173 and is arranged to receive an elbow fitting such as the fitting 81 for establishing communication between the duct 173 and the vacuum chamber 37 in the seed pick-up, separating and discharge mechanism 30.

It will be apparent that this duct arrangement is highly advantageous in that it provides a direct communication between the inlet ports of the bellows sections, is much easier and simpler to install and, in addition, the vacuum supply chamber defined thereby may have a relatively large volume which is highly desirable in obtaining a uniform vacuum pressure.

A further important feature of this invention is in a multi-row planter which is illustrated schematically in Figure 10. This planter comprises spaced single row planters 177, 178 and 179 each of which may preferably be constructed in a manner similar to the planter 20 as above described.

Drive shafts 180, 181 and 182 for the planters 177, 178, and 179, respectively, have bevel gears 183, 184 and 185 meshing respectively with bevel gears 186, 187 and 188 on a common drive shaft 189 which may have a gear 190 meshing with a gear 191 secured to a ground-engaging wheel 192, the planters 177, 178 and 179 being thereby driven simultaneously, and in synchronism. A pulley 193 on the shaft 189 is coupled to a pulley 194 through a belt 195, the pulley 194 being mounted on the drive shaft of a vacuum pump 196 with all three of the planters 177, 178 and 179 being connected to the pump 196 through conduit sections 197, 198, 199, 200, 201 and 202.

Accordingly, the individual vacuum pumps are not required on the planters 177, 178 and 179. However, if desired, a vacuum pump such as described above in connection with the planter 20 may be retained on one of the planters 177, 178 and 179 with the pump coupled to the other two planters so that the separate pump is not required on those two. However if a separate vacuum pump is retained on each of the planters 177, 178 and 179, the vacuum chambers of the pumps may preferably be connected together so that a more uniform vacuum may be achieved.

A pressurized air pump 203 is preferably driven in synchronism with the vacuum pump 196 and is connected to the pressurized air intakes of the planters 177, 178 and 179 through conduit sections 204, 205, 206, 207 and 208 so that only one such pump is required.

It may be noted that the planter mechanism as described above in connection with the mechanism 30 is highly advantageous in a multi-row planter of the type illustrated in Figure 10 since a separate source of vacuum may be used in connection with the planter mechanism 30. Also, the planter mechanism 30 is admirably suited for synchronized operation with like mechanism when it is desired to align seeds in transverse rows.

It will be understood that modifications and variations may be effected without departing from the spirit and scope of the novel concepts of the present invention.

I claim as my invention:

1. In a seed planter, a fixed hollow member, an endless belt member supported within said hollow member and having a plurality of peripherally spaced ports with each port arranged to pass sequentially through a pick-up zone, a separating zone and a discharge zone, and means projecting inwardly from the internal surface of said hollow member into sealing relationship with the outer surface of said belt member to provide a vacuum chamber outside only said pick-up and separating zones between an outside surface portion of said belt member and the facing internal surface portion of said hollow member.

2. In a seed planter, a fixed hollow member, an endless belt member supported within said hollow member and having a plurality of peripherally spaced ports with each port arranged to pass sequentially through a pick-up zone, a separating zone and a discharge zone, and means projecting inwardly from the internal surface of said hollow member into sealing relationship with the outer surface of said belt member to provide a vacuum chamber outside only said pick-up and separating zones between an outside surface portion of said belt member and the facing internal surface portion of said hollow member, each port being separated from said chamber in the discharge zone by said means so that a seed carried thereby will drop by gravity.

3. In a seed planter, an endless belt member having a plurality of peripherally spaced ports therein, and a support ring for receiving said belt member therewithin, said ring having a plurality of circumferentially spaced openings in a plane transverse to the axis thereof and through said ports, and said openings being spaced apart a distance less than the peripheral extent of said ports at the outer surface of said belt member.

4. In a seed planter, an endless belt member having a plurality of peripherally spaced ports therein, and a support ring for receiving said belt member therewithin, said ring having a plurality of circumferentially spaced openings in a plane transverse to the axis thereof and through said ports, and said openings being spaced apart a distance less than the peripheral extent of said ports at the outer surface of said belt member, and said ports being enlarged at the outer surface of said belt member.

5. In a seed planter, a fixed hollow member, an endless belt member having a plurality of peripherally spaced ports and supported in spaced relation within said hollow member, a pair of partition members extending inwardly from spaced internal surface portions of said hollow member into sealing relationship with the outer surface of said belt member to divide the space between said outer surface of said belt member and the internal surface of said hollow member into two separate chambers, one of said chambers being arranged for connection to a source of vacuum, and means providing an opening in the lowest point in the other of said chambers to release chaff and other extraneous matter therefrom.

6. In a seed planter, an endless belt member of resilient material having a plurality of peripherally spaced ports therein, a rigid support ring receiving said belt member therewithin and having a plurality of circumferentially spaced openings in a plane transverse to the axis thereof and through said ports, a hollow member receiving said support ring, and partition members extending inwardly from spaced internal surface portions of said hollow member into sealing engagement with the outer surface of said rigid support ring to divide the space between said outer surface of said ring and the internal surface of said hollow member into separate chambers.

7. In a seed planter, a fixed hollow member, an annular belt member having a plurality of peripherally spaced ports, means supporting said annular belt member for rotation about a non-vertical axis within said hollow member, means for supplying seeds to the lower inside surface portion of said belt member, means for applying a negative pressure to an outside surface portion of said belt member to attract seeds to said ports and cause the seeds to be carried upwardly as said belt member is rotated, a partition member extending between the inside surface of said hollow member and the outside surface of said belt member adjacent the upper end thereof, said partition member having an opening registering with said ports individually as said belt member is rotated, means for supplying a positive pressure to said opening to eject seeds from said ports and simultaneously clear the ports of extraneous matter, and a discharge shoot for receiving seeds in matter ejected from said ports.

8. In a seed planter, a main frame including a fixed hollow member, an endless belt member having a circular configuration and having a plurality of peripherally spaced ports, means supporting said belt member within said hollow member for rotation about a generally horizontal axis, means for supplying seeds into said belt member to rest against the lower inside surface thereof, means for rotating said belt member about said axis to cause each port to pass sequentially through a pick-up zone, then upwardly through a separating zone, then through a discharge zone and then downwardly to said pick-up zone, a pair of partitions projecting inwardly from the internal surface of said hollow member into sealing relationship with the outer surface of said belt member to provide a vacuum chamber outside only said pick-up and separating zones between an outside surface portion of said belt member and the facing internal surface portion of said hollow member, and vacuum pump means coupled to said vacuum chamber.

9. In a seed planter, an endless belt member of resilient material having a plurality of peripherally spaced ports therein, a rigid support ring receiving said belt member therewithin and having a plurality of circumferentially spaced openings in a plane transverse to the axis thereof and through said ports, a hollow member receiving said support ring, and partition members extending inwardly from spaced internal surface portions of said hollow member into sealing engagement with the outer surface of said rigid support ring to divide the space between said outer surface of said ring and the internal surface of said hollow member into separate chambers, said belt member having a conical outer surface and said support ring having a conical inner surface complementary with said conical outer surface.

10. In a seed planter, a main frame including a fixed hollow member, an endless belt member having a circular configuration and having a plurality of peripherally spaced ports, means supporting said belt member within said hollow member for rotation about a generally horizontal axis, means for supplying seeds into said belt member to rest against the lower inside surface thereof, means for rotating said belt member about said axis to cause each port to pass sequentially through a pick-up zone, then upwardly through a separating zone, then through a discharge zone and then downwardly to said pick-up zone, a pair of partitions projecting inwardly from the internal surface of said hollow member into sealing relationship with the outer surface of said belt member to provide a vacuum chamber outside only said pick-up and separating zones between an outside surface portion of said belt member and the facing internal surface portion of said hollow member, vacuum pump means coupled to said vacuum chamber, and a plurality of ribs on the inner surface of said belt member slanted to project seeds toward said ports as said belt member is rotated.

11. In a multi-row seed planter, a plurality of spaced single row planters each comprising a fixed hollow member, an endless belt member supported within said hollow member and having a plurality of peripherally spaced ports with each port arranged to pass sequentially through a pick-up zone, a separating zone and a discharge zone, and means projecting inwardly from the internal surface of said hollow member into sealing relationship with the outer surface of said belt member to provide a vacuum chamber outside only said pick-up and separating zones between an outside surface portion of said belt member and a facing internal surface portion of said hollow member, drive means connected to all of said belt members, a vacuum pump driven by said drive means, and means connecting all of said vacuum chambers to said vacuum pump.

12. In a multi-row seed planter, a plurality of spaced single row planters each comprising a fixed hollow member, an endless belt member supported within said hollow member and having a plurality of peripherally spaced ports with each port arranged to pass sequentially through a pick-up zone, a separating zone and a discharge zone, and means projecting inwardly from the internal surface of said hollow member into sealing relationship with the outer surface of said belt member to provide a vacuum chamber outside only said pick-up and separating zones between an outside surface portion of said belt member and a facing internal surface portion of said hollow member, drive means connected to all of said belt members, a vacuum pump driven by said drive means, means connecting all of said vacuum chambers to said vacuum pump, a pressure pump driven by said drive means, and means connecting said pressure pump to all of said planters at their respective discharge zones.

13. In a seed planter, an endless belt member of resilient material having a plurality of peripherally spaced ports therein, a rigid support ring receiving said belt member therewithin and having a plurality of circumferentially spaced openings in a plane transverse to the axis thereof and through said ports, a hollow member receiving said support ring, partition members extending inwardly from spaced internal surface portions of said hollow member into sealing engagement with the outer surface of said rigid support ring to divide the space between said outer surface of said ring and the internal surface of said hollow member into separate chambers, and a generally cylindrical seed container removably secured on said ring for rotation therewith.

14. In a seed planter, a main frame including a fixed hollow member, an endless belt member having a circular configuration and having a plurality of peripherally spaced ports, means supporting said belt member within said hollow member for rotation about a generally horizontal axis, means for supplying seeds into said belt member to rest against the lower inside surface thereof, means for rotating said belt member about said axis to cause each port to pass sequentially through a pick-up zone, then upwardly through a separating zone, then through a discharge zone and then downwardly to said pick-up zone, a pair of partitions projecting inwardly from the internal surface of said hollow member into sealing relationship with the outer surface of said belt member to provide a vacuum chamber outside only said pick-up and separating zones between an outside surface portion of said belt member and the facing internal surface portion of said hollow member, vacuum pump means coupled to said vacuum chamber, means at said discharge zone for effecting release of seeds from said ports, and a discharge tube for receiving the released seed, said discharge tube being located closer to the downward-travelling side of the belt member than to the upward-travelling side thereof.

References Cited in the file of this patent

UNITED STATES PATENTS

| | | |
|---|---|---|
| 1,006,984 | Sheetz | Oct. 24, 1911 |
| 1,258,105 | Gally | Mar. 5, 1918 |
| 1,272,249 | Gally | July 9, 1918 |
| 1,331,235 | Bristow | Feb. 17, 1920 |
| 1,371,517 | Oliver | Mar. 15, 1921 |
| 1,570,795 | Tainton | Jan. 26, 1926 |
| 1,637,834 | Oliver | Aug. 2, 1927 |
| 1,762,671 | Slathar | June 10, 1930 |
| 2,031,713 | Johnson | Feb. 25, 1936 |
| 2,054,319 | Hanson | Sept. 15, 1936 |
| 2,054,320 | Hanson | Sept. 15, 1936 |
| 2,152,758 | Cox | Apr. 4, 1939 |
| 2,324,823 | Chilson | July 10, 1943 |
| 2,325,665 | Cox | Aug. 3, 1943 |
| 2,326,276 | Avedikian | Aug. 10, 1943 |
| 2,384,820 | Dodwell | Sept. 18, 1945 |
| 2,505,758 | Enebeck | May 2, 1950 |
| 2,601,786 | Best | July 1, 1952 |

FOREIGN PATENTS

| | | |
|---|---|---|
| 16,282 | Great Britain | of 1914 |